United States Patent [19]

Grant

[11] Patent Number: 4,673,127

[45] Date of Patent: Jun. 16, 1987

[54] REMOTE CONTROL MEANS FOR HEATING/COOLING DEVICES

[76] Inventor: Willie T. Grant, 400 So. Simms St., Lakewood, Colo. 80228

[21] Appl. No.: 886,328

[22] Filed: Jul. 17, 1986

[51] Int. Cl.[4] ........................................... H04M 11/04
[52] U.S. Cl. ................................. 236/51; 340/310 A; 340/538
[58] Field of Search .................... 236/51, 49; 340/538, 340/310 A

[56] References Cited

U.S. PATENT DOCUMENTS

| | | | |
|---|---|---|---|
| 3,411,150 | 11/1968 | Schulein | 340/538 |
| 3,462,756 | 8/1969 | Mills | 340/538 X |
| 3,972,471 | 8/1976 | Ziegler | 236/51 X |
| 4,132,355 | 1/1979 | Cleary et al. | 236/51 X |

Primary Examiner—William E. Wayner

[57] ABSTRACT

A generator/transmitter, having an IC timer with frequency changing means, generating a precoded signal and impressing said signal on a high-voltage, low frequency carrier wave, said signal being transported to remote receiver means by said carrier wave, said receiver means, having variable code validating means, demodulates, validates, amplifies, rectifies, and temporarily stores said signal on capacitor means to operate relay means and/or IC timer means of a second generator/transmitter, said relay means operating fuel control means of a heating/cooling device or control means of rotatable closure means in a duct network of said heating/cooling device.

2 Claims, 5 Drawing Figures

REMOTE CONTROL MEANS FOR HEATING/COOLING DEVICES

In patent application Ser. No. 782,614 there is set forth a novel means for operating furnace means and rotatable closure means mounting in a duct of a heating-/cooling device using generator/transmitter means. The generator/transmitter means generate and transmit a coded signal over the existing power wiring to receiver means connecting to the high voltage wiring. The receiver means amplify, demodulate, and pass the validated signal to rectifying and storage means for operation of relay means, thereby energizing rotatable closure means and fuel control means of furnace means.

The present invention sets forth particular generator/transmitter means of coded signal means and particular receiver validating means to differentiate between a valid signal and an invalid signal that may access the receiver means.

An IC timer, wired for astable or free running operation, is operated by room or zone thermostatic means having thermostatic switch means. When the thermostatic means require that the furnace means increase the room or zone temperature said thermostatic switch means closes to energize the timer means. The timer, being pre-coded through resistor and capacitor means, generates a pre-coded signal that is impressed upon the high voltage power wiring through a low-voltage/high-voltage interface. The low-voltage signal rides "piggy-back" on the high-voltage wave network to the receiver means.

At the receiver means a low-voltage/high-voltage interface permits passage of the low-voltage, high frequency signal but restricts passage of the high-voltage, low frequency carrier wave. By means of one or more active band-pass filters, the high frequency signal is tested for proper validity for the present receiver. If the signal is valid it passes through the filtering system and emerges as an amplified signal. Upon exiting from the final filter, the signal is temporarily stored on capacitor means and used to operate relay means. If the high frequency signal is determined to be an invalid signal for the particular receiver, each filter attentuates the signal, thereby making it too weak to operate the relay means when stored on the capacitor means.

It is the primary object of the present invention to provide simple, economical means for generating, transmitting and demodulating coded signal means; said coded signal means being carried on the high-voltage waves of residential power lines.

This and other objects and advantages of the present invention will become apparent after considering the following detailed specification and drawing figures wherein.

Figure 1:
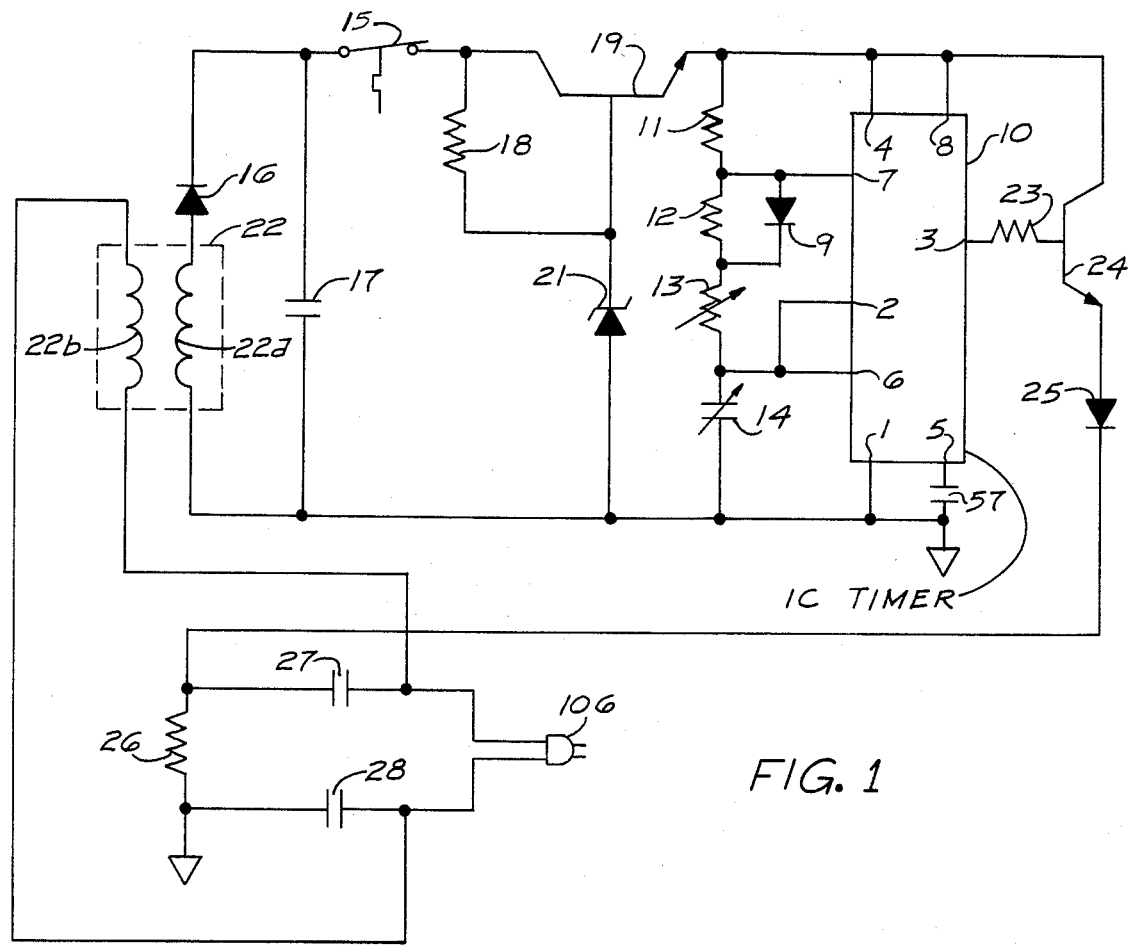
FIG. 1 is a schematic diagram of the signal/generator circuit.

Referring to the drawings by identification numbers, the number 10 of FIG. 1 refers to the IC 555 timer means having resistors 11, 12, and 13 connected in series with capacitor 14.

When thermostatic switch 15 closes, communicating the requirement for a positive change in the room or zone temperature, capacitor 17, connecting to the collector of transistor 19 and power source 22 through diode 16, energizes timer 10. Resistor 18 and zener diode 21 establish a reference voltage on the base of transistor 19, said reference voltage being seen at the emitter junction with resistor 11. Power is applied to the timer 10 at pins 4 and 8 from capacitor 17. Capacitor 14 is charged through resistor 11, diode 9, and resistor 13, and discharges through resistors 13, and 12 at pin 7 of the timer in the manner well known to those versed in the art.

(In FIG. 1 thermostatic switch 15 is shown as a generic temperature operated switch. In particular switch 15 could be a bimetal thermostatic coil similar to those commonly used in wall thermostats. However, an electronic circuit, as shown in FIG. 3, can be used to replace thermostatic switch 15.)

Figure 3:
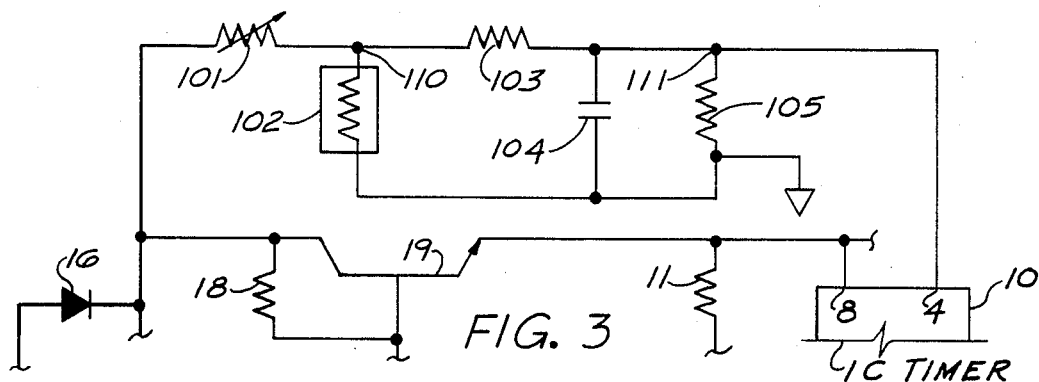
FIG. 3 is a schematic diagram for an alternate thermostatic control circuit.

In FIG. 3 resistor 101, in combination with thermistor 102, establishes a reference voltage at junction 110 formed by resistors 101, 103, and thermistor 102. Resistor 103 establishes a predetermined voltage on capacitor 104 and pin 4 of timer 10, in combination with resistor 101 and thermistor 102. As the room or zone temperature decreases the resistance of thermistor 102 increases causing the reference voltages at nodes 110 and 111 to increase and placing said predetermined voltage on pin 4 of timer 10 thereby causing said timer to oscillate. As thermistor 102 experiences a temperature increase, its resistance decreases until the reference voltages at nodes 110 and 111 cause pin 4 of timer 10 to go "low", under the influence of resistor 105, and terminate the operation of timer 10.)

The combination of resistors 11-13 and capacitor 14 of (FIG. 1) generate a square wave of predetermined frequency. Because variable resistor 13 is common to both the charging circuit and the discharging circuit, the output frequency of the square wave can be varied by variable resistor 13 and/or variable capacitor 14.

Figure 2:
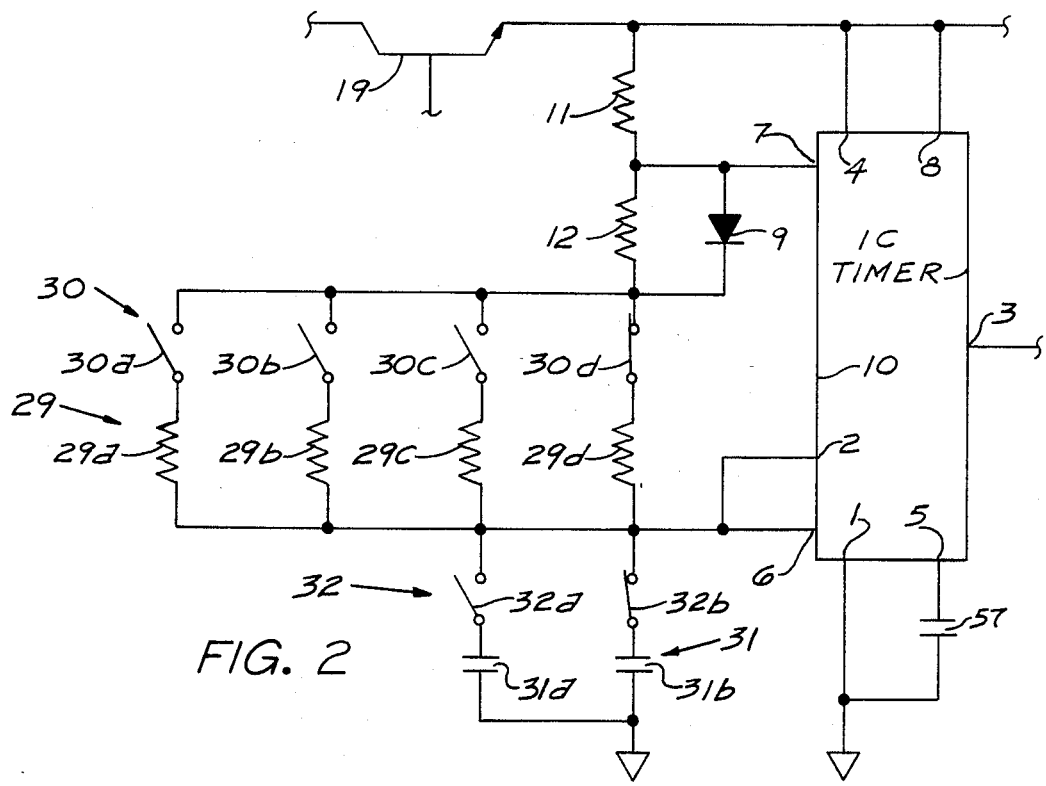
FIG. 2 is a circuit diagram for the IC timer coding system using discrete resistors, capacitors, and programmable switches.

As may be seen in FIG. 2, the variable resistor 13 can be replaced by a number of discrete resistors 29a–29d interconnected by programmable switch means 30, having switches 30a–30d, and variable capacitor 14 can be replaced by capacitor bank 31, having discrete capacitors 31a and 31b interconnected to each other and to said resistors by programmable switch means 32, having porgrammable switches 32a and 32b.

The output signal of timer 10 (FIG. 1) appears at pin 3 and passes through resistor 23, which is in series with pin 3 and the base of voltage follower and buffer transistor 24. With the collector of transistor 24 energized through connection to capacitor 17 by means of transistor 19, the signal appears across the emitter of transistor 24 and diode 25, said diode having connection to resistor 26 and capacitor 27. The low-voltage, high frequency signal is impressed upon the high-voltage, low frequency carrier wave at the junction of diode 25, capacitor 27 and resistor 26. Capacitors 27 and 28 are coupling capacitors between the low-voltage circuit and the high-voltage circuit (wall plug 106 being included in the high-voltage circuit). Capacitor 27 also acts in combination with resistor 26 as a high-pass filter.

Figure 4:
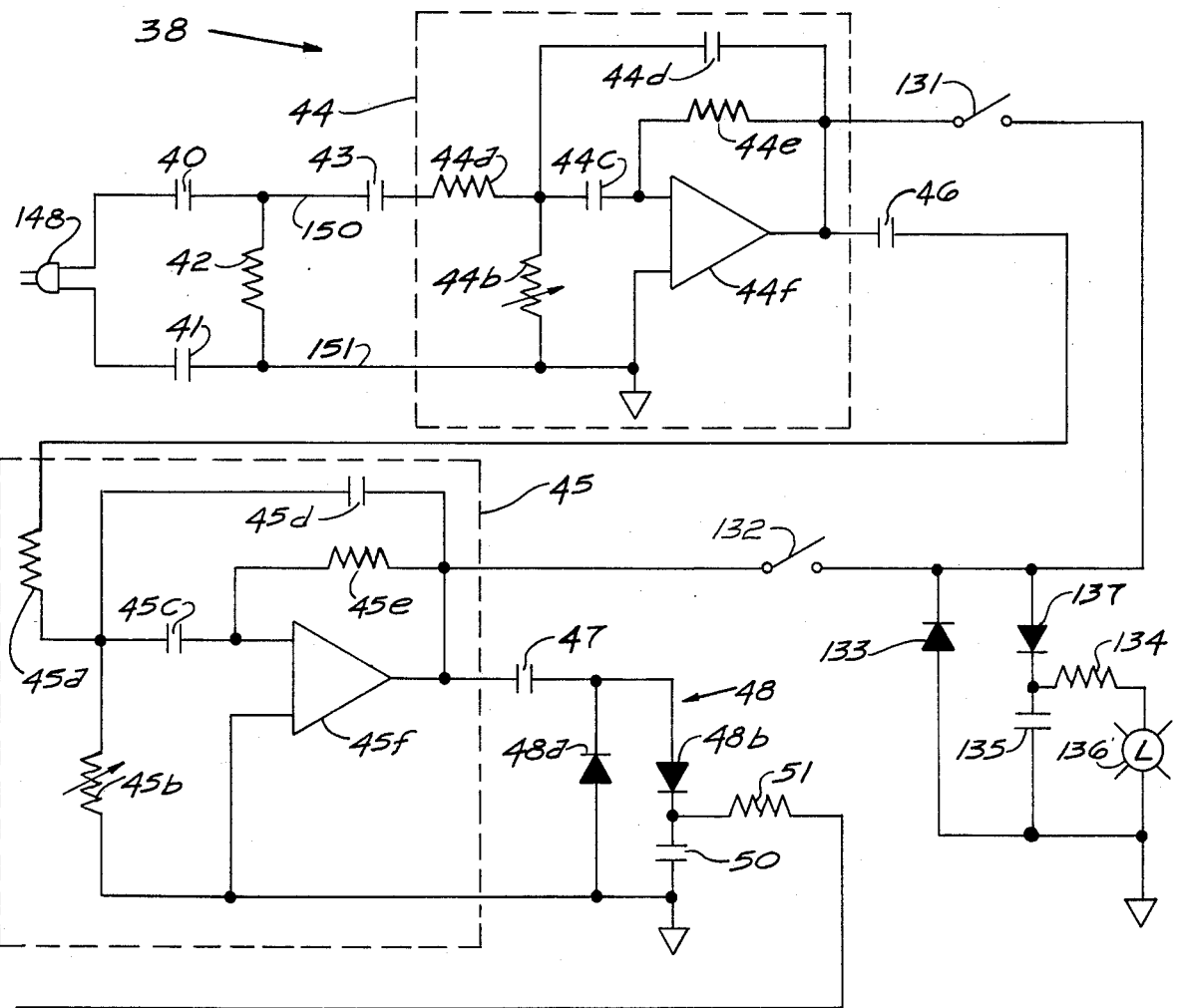
FIG. 4 is a schematic diagram for the receiver means.
Figure 4:
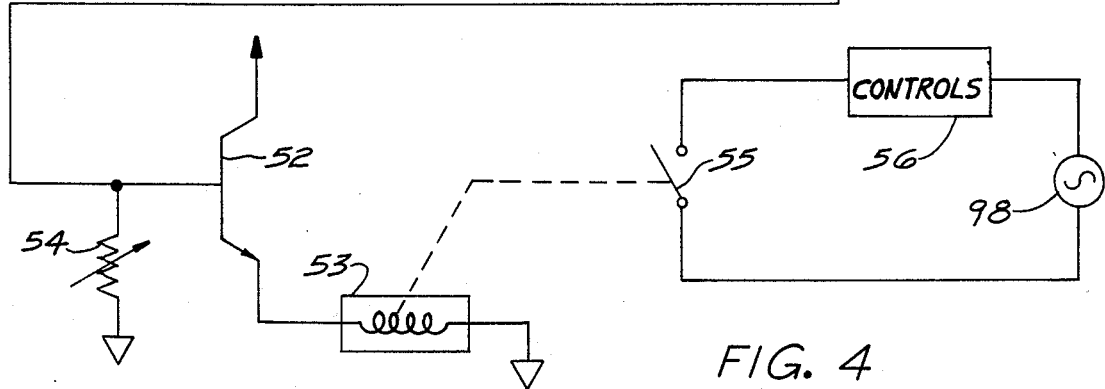

Having been impressed upon the high-voltage carrier wave the signal is carried to the receiver means, shown in FIG. 4, by the wiring network having connection to capacitors 40 and 41 and conductors 150 and 151. Here the signal is separated from the high-voltage wave by means of the high-pass filter comprised of coupling capacitor 40 and resistor 42, the second coupling capacitor being capacitor 41. The signal traverses capacitor 43 and is determined to be valid or invalid by the active band-pass filter 44 which is comprised of fixed resistors 44a and 44e, variable resistor 44b, capacitors 44c and 44d and operational amplifier 44f. The variability of resistor 44b makes filter 44 a variable filter. If the signal is determined to be valid for receiver 38, it is amplified by filter/amplifier 44 and passed on via capacitor 46 to filter/amplifier 45, filter/amplifier 45 being identical in construction to filter/amplifier 44. The valid signal traverses voltage doubler 48 comprised of capacitor 47, diodes 48a and 48b, and said signal is stored as a dc voltage on capacitor 50 to operate relay 53 through resistor 51, timing resistor 54, and transistor 52; said relay 53 incorporating switch means 55 to energize control means 56 of rotatable closure means or control means of similar devices.

Figure 5:
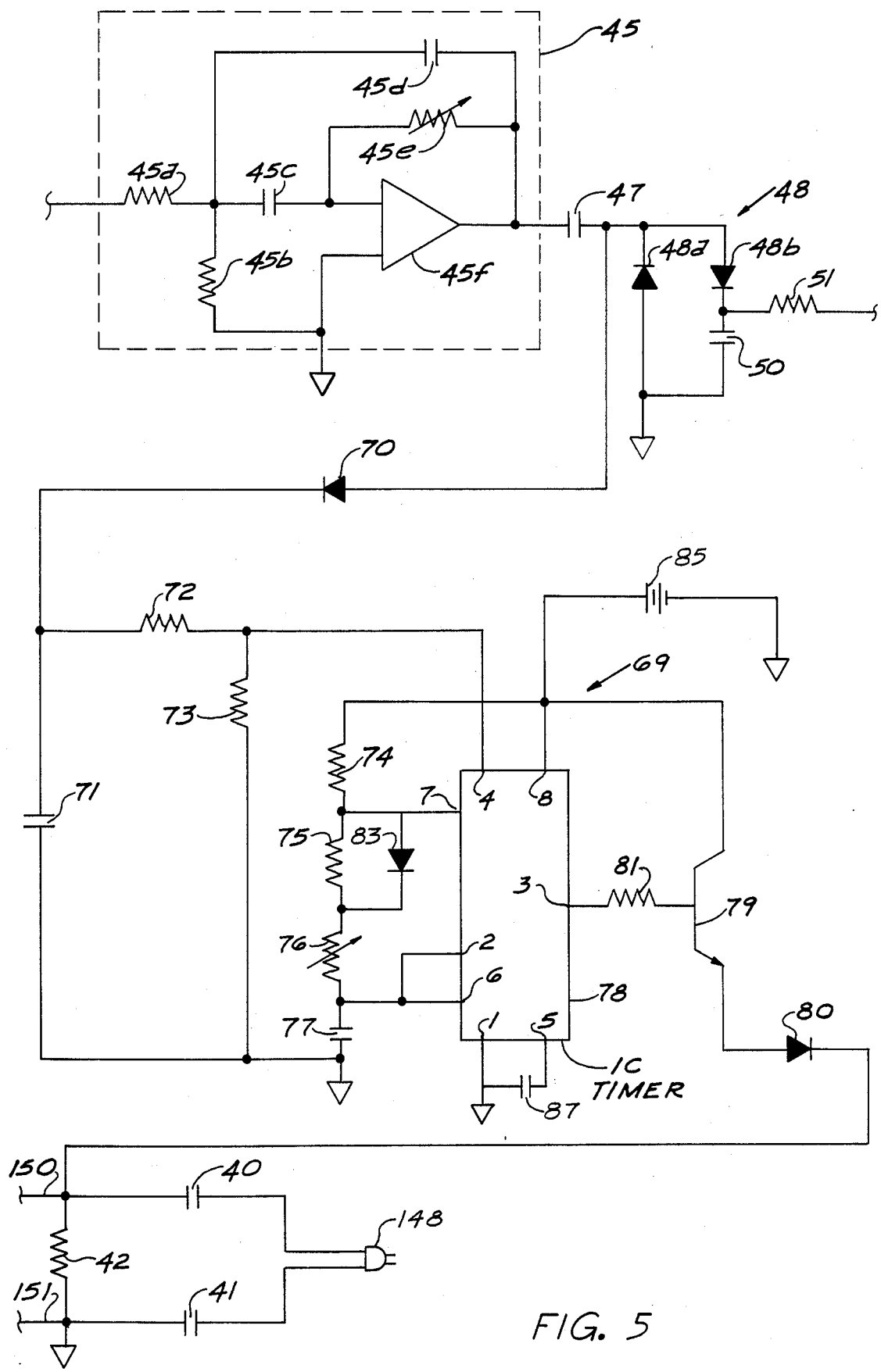
FIG. 5 is a schematic diagram of partial receiver means operating a generator/transmitter.

In addition to operating the control means of rotatable closure means receiver 38 (FIG. 4) can be used to drive a duplicate of the signal generator of FIG. 1, said generator transmitting a coded signal to a second receiver identical to receiver 38; said second receiver provides operational means for the fuel control means of a heating/cooling device. Such a tandem connection is shown in FIG. 5 where it is seen that signal generator 69, commencing with diode 70 and terminating with diode 80, interconnects with the first receiver diodes 48a, 48b and capacitor 47.

The signal validated by receiver 38 as previously described passes through voltage doubler 48 as aforementioned; said signal is also transmitted through diode 70 to be stored on capacitor 71 from which, in combination with resistors 72 and 73, positive dc voltage signal is placed on pin 4 of timer 78. As a result of pin 8 of timer 78 always being at the potential of battery 85, timer 78 oscillates when pin 4 goes "high" as a result of said signal passing through filter/amplifier 45 of receiver 38 and being stored on capacitor 71 as previously stated. Timer 78 generates a high frequency signal determined by resistors 74, 75, 76 and capacitor 77 as previously explained for the signal generator shown in FIG. 1. While power source 85 continuously energizes pin 8, of timer 78, resistors 72 and 73 establish a proper voltage on pin 4 of said timer for the operation of aforesaid tiaer. When a signal is not being received by receiver 38 of FIG. 4 and no charge is on capacitor 71 (FIG. 5), resistor 73 is such that pin 4 of timer 78 goes "low" and said timer is inoperative.

During the time that a valid signal is being input to receiver 38 (FIG. 4), the frequency signal generated by signal generator 78 is transmitted from pin 3 through resistor 81, buffer transistor 79, diode 80 and is impressed upon the high-voltage line across the high-pass filter comprised of resistor 42 and capacitor 40. The signal is then transmitted to and received by a second receiver identical to previously described receiver 38 which validates the signal before amplification and passage of said signal to operate relay means (identical to 53) which in turn operates control means (similar to control means 56) of a heating/cooling device or similar means.

It was previously stated that the frequency of the transmitter could be varied by means of variable resistor 13 and/or variable capacitor 14, shown in FIG. 1. Upon changing the frequency of the transmitter, it is also required that the receiver means be changed in order that the previous signal can be rejected and the new signal will be accepted as the valid signal.

In order for the user to know that the receiver has been tuned to the correct frequency, an indicator circuit (FIG. 4) comprising switch means 131 and 132, diodes 133 and 137, resistor 134, capacitor 135 and light means 136, is employed. When switch means 131 is closed and variable resistor 44b adjusted until a maximun peak voltage appears across switch 131 from filter/amplifier 44, capacitor 135 will receive a maximum voltage charge through diodes 133 and 137. Light means 136 connecting to voltage limiting resistor 134 will have its maximum illumination at this peak voltage. Thus, at this point the user knows that filter/amplifier 44 is optimized relative to the generated frequency. Switch means 131 is then opened and switch means 132 is closed and the foregoing procedure is repeated for filter/amplifier 45, using variable resistor 45b. With indicator means as described, it is not necessary that the user know what frequency is being generated, rather it is only required that the receiver be properly programmed as heretofore explained.

Although only two filter/amplifiers are shown, additional units can be serially added in order to make the receiver means more highly selective.

Thus, there has been shown and described in the foregoing specification the means for generating and validating a variable frequency signal, said signal being capable of operating relay means to control other electrical or electronic devices such as fuel control means of a heating/cooling device and motor means of rotatable damper means. Many changes, modifications, variations and other uses and applications will become apparent to those skilled in the art after considering this specification and the accompanying drawings. All such changes, modifications, variations, and other uses and applications which do not depart from the spirit and scope of the invention which is limited only by the claims which follow:

I claim:

1. Transmitter/receiver means having IC timing means with frequency changing means, said frequency changing means permitting the generation and validation of a wide range of low-voltage frequencies transmissible over existing high-voltage conductors; said transmitter/receiver means having a signal generator comprising said IC timing means and said frequency changing means, said signal generator transmitting said low-voltage signal across buffer means to a low-voltage/high-voltage interface, said interface comprising high-pass filtering means and coupling means, said low-voltage frequencies being impressed upon high-voltage waves, said high-voltage waves being carrier waves for low-voltage frequency waves; said signal generator being triggered through thermostatic means, said thermostatic means coupling said generator to power source means; a first receiver of receiver means of said transmitter/receiver means receiving said low-voltage frequencies at a low-voltage/high-voltage interface, said interface of said first receiver means comprising coupling means and high-pass filtering means, said first receiver means comprising variable frequency validation means, coupled with filtering means, and amplifying means combined with voltage rectifying means feeding to voltage storing means, and relay timing means, said storing means operating relay means, said relay means operating control means of external means.

2. The transmitter/receiver means defined in claim 1 having second receiver means, said second receiver means intercepting low-voltage frequencies at a low-voltage/high-voltage interface, said interface of said second receiver means comprising coupling means and high-pass filtering means, said second receiver means having variable frequency validation means, coupled with said filtering means, and amplification means in conjunction with a first and second voltage rectifying means coupled to first and second voltage storing means respectively, and relay timing means; said first voltage storing means operating relay means, said relay means operating control means of external means, said second voltage storing means operating IC timer means of second signal generator means, said second signal generator means comprising said IC timer means and frequency changing means, said signal generator transmitting low-voltage frequencies across buffer means to said low-voltage/high-voltage interface of said second receiver means, said low-voltage frequency being impressed upon said high-voltage carrier waves at said interface, said signal from said transmitter/receiver means being received and validated by said first receiver and operating said relay means of said first receiver and control means of heating/cooling means.

* * * * *